(12) United States Patent
Singgih et al.

(10) Patent No.: US 7,159,771 B2
(45) Date of Patent: Jan. 9, 2007

(54) INFORMATION PROCESSING TERMINAL WITH ADJUSTABLE AND FOLDABLE SUPPORT STAND

(75) Inventors: Khairil Singgih, City of Industry, CA (US); See Hing Tiang, City of Industry, CA (US)

(73) Assignee: Pioneer Pos Inc., City of Industry, CA (US)

( * ) Notice: Subject to any disclaimer, the term of this patent is extended or adjusted under 35 U.S.C. 154(b) by 36 days.

(21) Appl. No.: 11/001,377

(22) Filed: Nov. 30, 2004

(65) Prior Publication Data

US 2006/0113382 A1    Jun. 1, 2006

(51) Int. Cl.
    G06K 15/00    (2006.01)
(52) U.S. Cl. ..................... 235/383; 235/375
(58) Field of Classification Search ............... 235/383; 705/2; 701/200; 248/454, 462
    See application file for complete search history.

(56) References Cited

U.S. PATENT DOCUMENTS

| | | | | |
|---|---|---|---|---|
| 5,682,182 A | * | 10/1997 | Tsubosaka | 345/173 |
| 6,381,125 B1 | * | 4/2002 | Mizoguchi et al. | 361/682 |
| 6,899,311 B1 | * | 5/2005 | Ternus | 248/454 |
| 2003/0033079 A1 | * | 2/2003 | Endicott | 701/200 |
| 2003/0234332 A1 | * | 12/2003 | Yen et al. | 248/404 |
| 2004/0019535 A1 | * | 1/2004 | Perkowski | 705/27 |
| 2004/0186744 A1 | * | 9/2004 | Lux | 705/2 |
| 2005/0041379 A1 | * | 2/2005 | Jang | 361/681 |
| 2005/0104863 A1 | * | 5/2005 | Kroll | 345/173 |
| 2005/0236533 A1 | * | 10/2005 | McRight et al. | 248/161 |

* cited by examiner

*Primary Examiner*—Michael G. Lee
*Assistant Examiner*—Kristy A. Haupt
(74) *Attorney, Agent, or Firm*—East IP Group; Philip K. Yu

(57) ABSTRACT

An information kiosk is disclosed. The information kiosk preferably has a touch-screen LCD display for convenient user interface. The information kiosk has an adjustable support stand for supporting the kiosk for convenient viewing by its users. The support stand also has a nested extension leg, which can be pulled out from stowage within the support stand. The extension leg, when pulled out and locked to the support stand, extends the length of the support stand, thus providing different viewing angles for the kiosk users with different heights, while maintaining the same angle between the support stand and the display head. The hinge, between which the hinge and the display body is connected, has a tension-based movement to prevent the kiosk from unintentional collapse. Ventilation openings are implemented on the upper back side of the kiosk. A barcode scanner is preferably integrally positioned to the top of the LCD display.

16 Claims, 10 Drawing Sheets

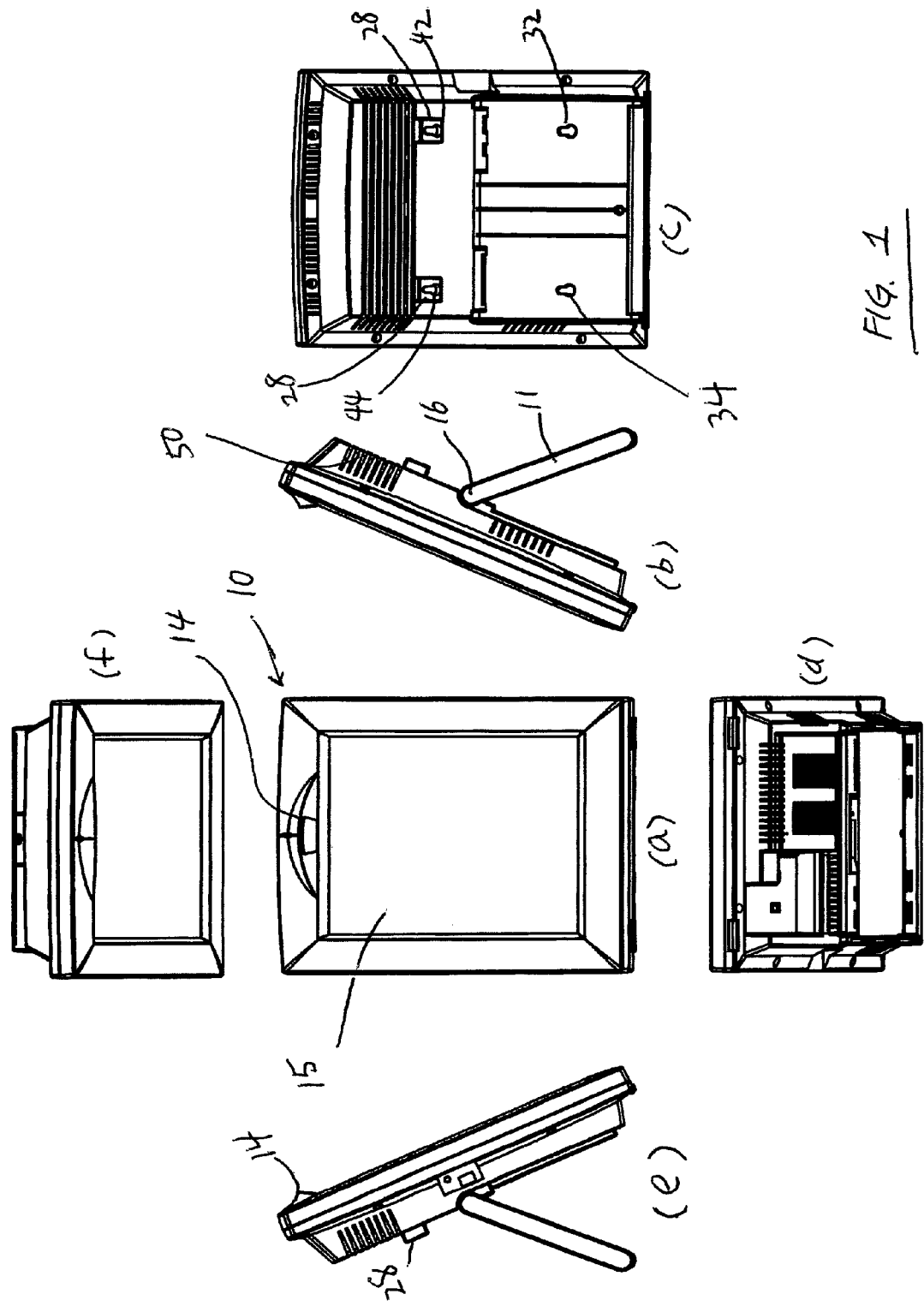

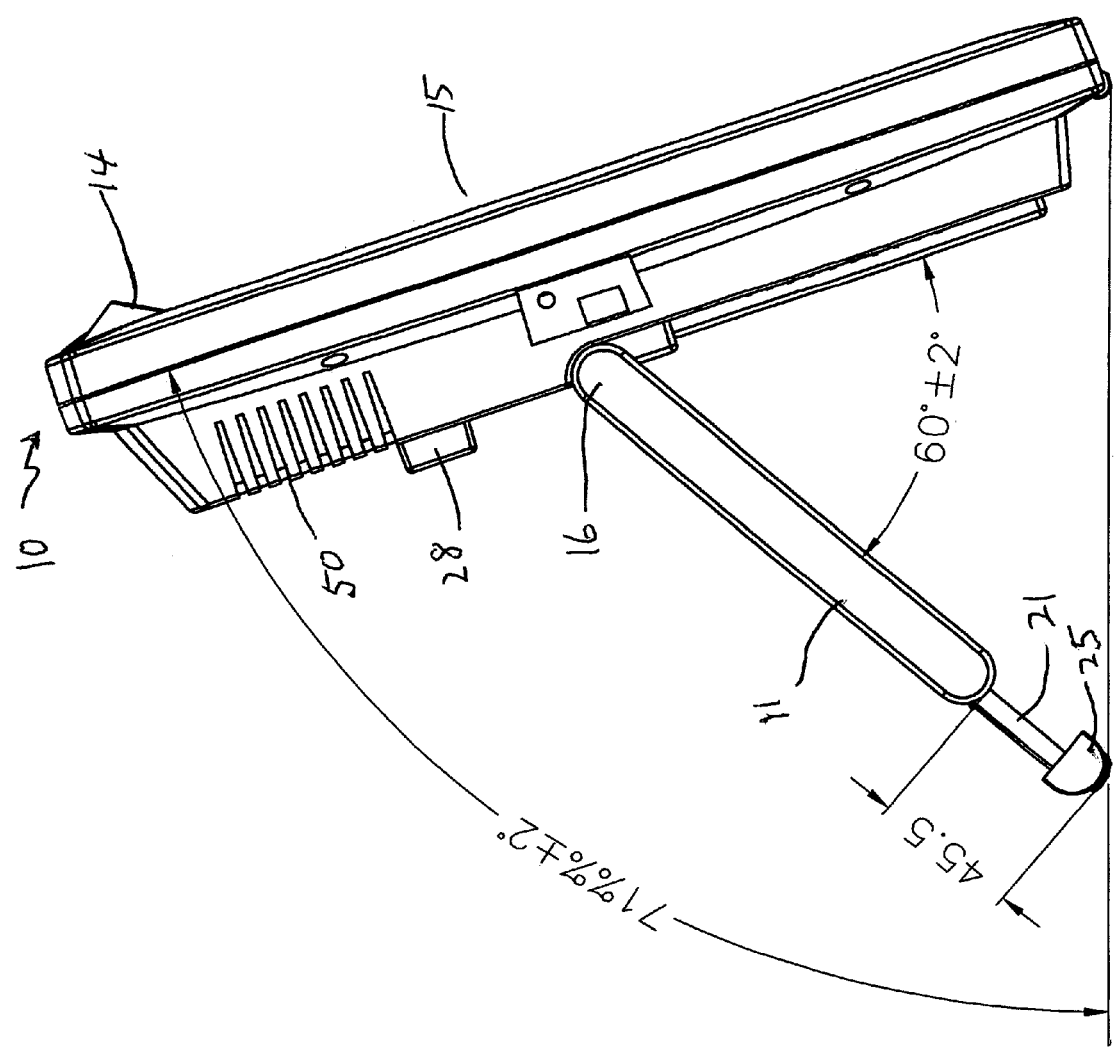

INFORMATION PROCESSING TERMINAL WITH ADJUSTABLE AND FOLDABLE SUPPORT STAND

FIELD OF THE INVENTION

The present application relates to electronic information processing and self-service display terminals, and more particularly relates to information terminals with a touch-sensitive screen.

ART BACKGROUND

With the proliferation of Internet communication and the explosive growth in information, consumers and businesses have become accustomed to having information available to them almost instantaneously, wherever they may be. While a personal computer ("PC") provides dedicated information processing for its users, it has proved to be an overachieving solution for some vertical and task-specific applications, such as self-service kiosks, point-of-sales terminals ("POS"), or information kiosks) due to the PC's inherent structural requirements.

Information terminals or kiosks are meant to be installed at various locations, such as retail, hospitality venues, or manufacturing sites for the convenience of the consumers or the businesses. Such information kiosks have some common characteristics. Their "footprint" is generally much smaller than a typical PC so that they can be easily positioned, either placed on the countertop, or mounted on the wall. They also should be easy to set up, without having to sort through the tangled wires typically found in a PC and its various peripheral units. Further, a information kiosk is seldom required to handle the same amount of information processing as the PC, even though it is not uncommon for the information kiosk to pack as much processing prowess as a typical PC. Finally, a PC-based information kiosk invariably requires fans for cooling and ventilation purposes, thus generating noise to the environment and prone to mechanical failure.

The conventional information kiosks in use today generally have a touch-sensitive screen for convenient data inputting. They also have a full complement of useful components, including a processor, a VGA display, some random memory, a hard drive, networking, and possibly an audio unit for multimedia presentation capability. The conventional information kiosk is further provided with a swivel stand, such that it can be operated and viewed from many angles. However, a swivel-based information kiosk commonly requires two discrete structures for the assembly, i.e. the "display head" in which the main processing unit is housed, and the swivel stand, thus making shipping and assembly more cumbersome. Additionally, if the display head is to be mounted to the wall, it needs to be disassembled from the base, thus creating a storage problem.

Therefore, it is desirable to have an information kiosk with a unitary integrated housing structure for both countertop and wall-mounted applications.

It is also desirable to have an information kiosk that can provide convenient viewing angles.

SUMMARY OF THE INVENTION

An information kiosk with adjustable and foldable support stand is disclosed. The information kiosk, or information terminal, preferably has a touch-screen LCD display for convenient user interface. The information kiosk has an adjustable support stand for supporting the kiosk for convenient viewing by its users. The support stand also has a nested extension leg, which can be pulled out from stowage within the support stand. The extension leg, when pulled out and locked to the support stand, extends the length of the support stand, thus providing different viewing angles for the kiosk for different users with different heights. The hinge, between which the hinge and the display body is connected, has a tension-based movement to prevent the kiosk from unintentional collapse. Ventilation openings are implemented on the upper back side of the kiosk. A bar code scanner is preferably integrally positioned to the top of the LCD display.

BRIEF DESCRIPTION OF THE FIGURES

FIGS. 1 (*a*)–(*f*) illustrate the exemplary information kiosk with an adjustable support stand of the present invention in various views.

FIGS. 2 (*b*) and (*c*) illustrate the information kiosk with the extension leg extended from within the now-deployed support stand.

DETAILED DESCRIPTION OF THE PREFERRED EMBODIMENTS

An information kiosk with an adjustable support stand is disclosed. In the following description, numerous specific details are set forth to provide a full understanding of the present invention. It will be obvious, however, to one ordinarily skilled in the art that the present invention may be practiced without some of these specific details. In other instances, well-known structures and circuits have not been shown in detail so as to avoid unnecessarily obscuring the present invention. Also, the terms "kiosk" and "terminal" are used interchangeably in the description herein to denote a generally fully-contained information and display terminals, such as self-service kiosks, POS terminals, or information kiosks.

Figure 2A:
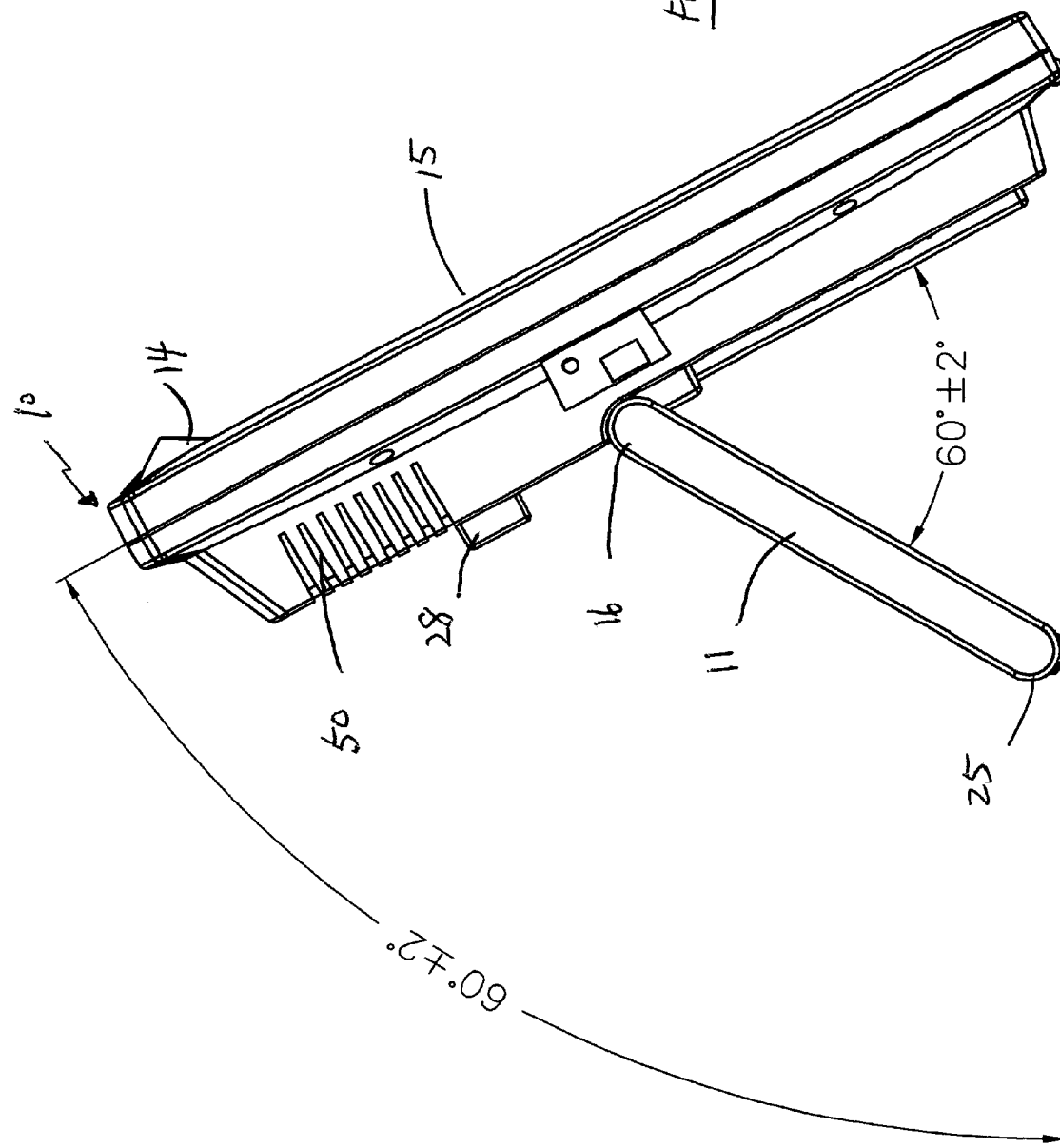
FIGS. 2 (*a*) and (*d*) illustrate the exemplary information kiosk with its support stand deployed.
Figure 2C:
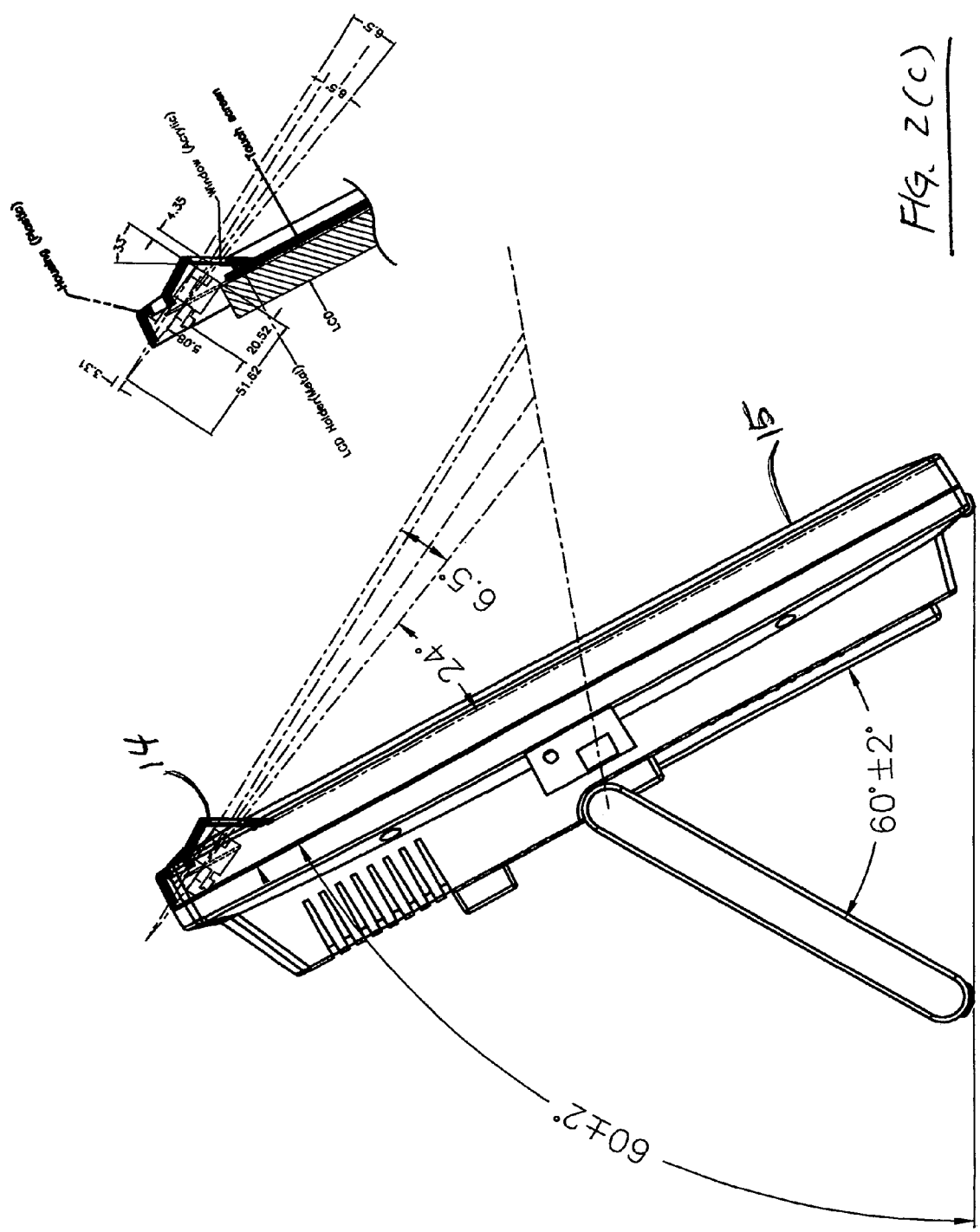
Figure 2D:
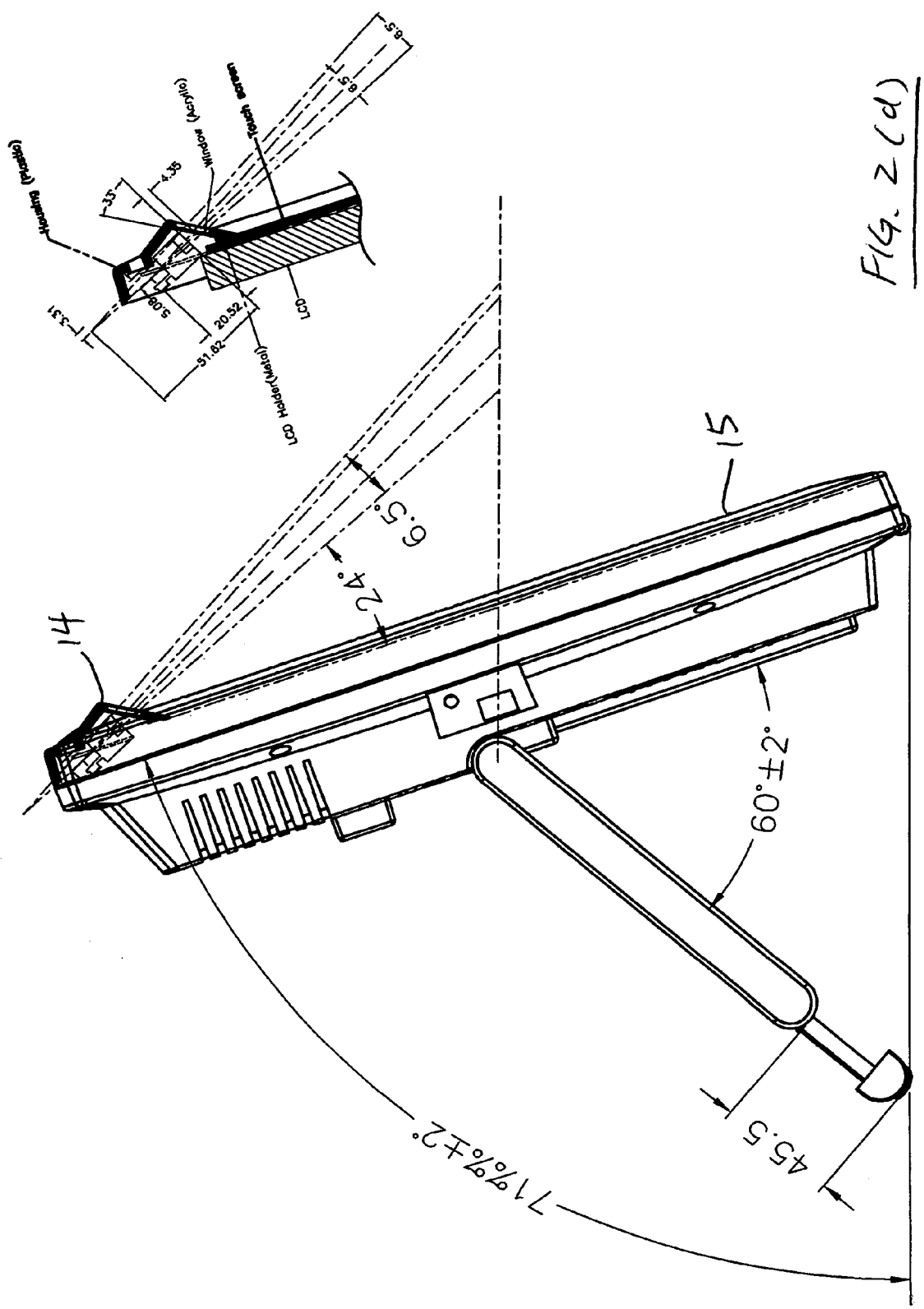
Figure 3:
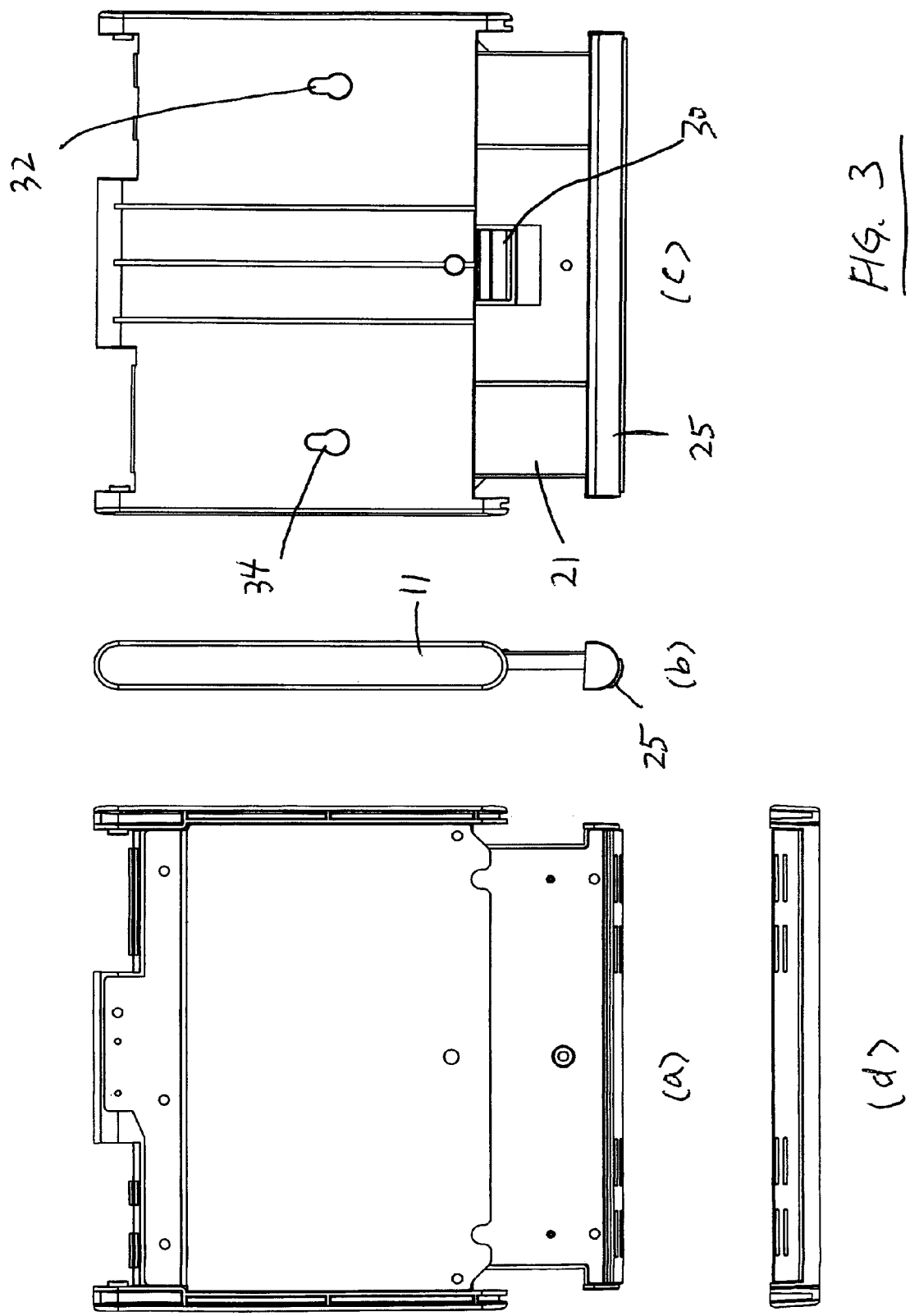
FIGS. 3 (*a*)–(*d*) illustrate the support stand with the extension leg in various views.
Figure 4:
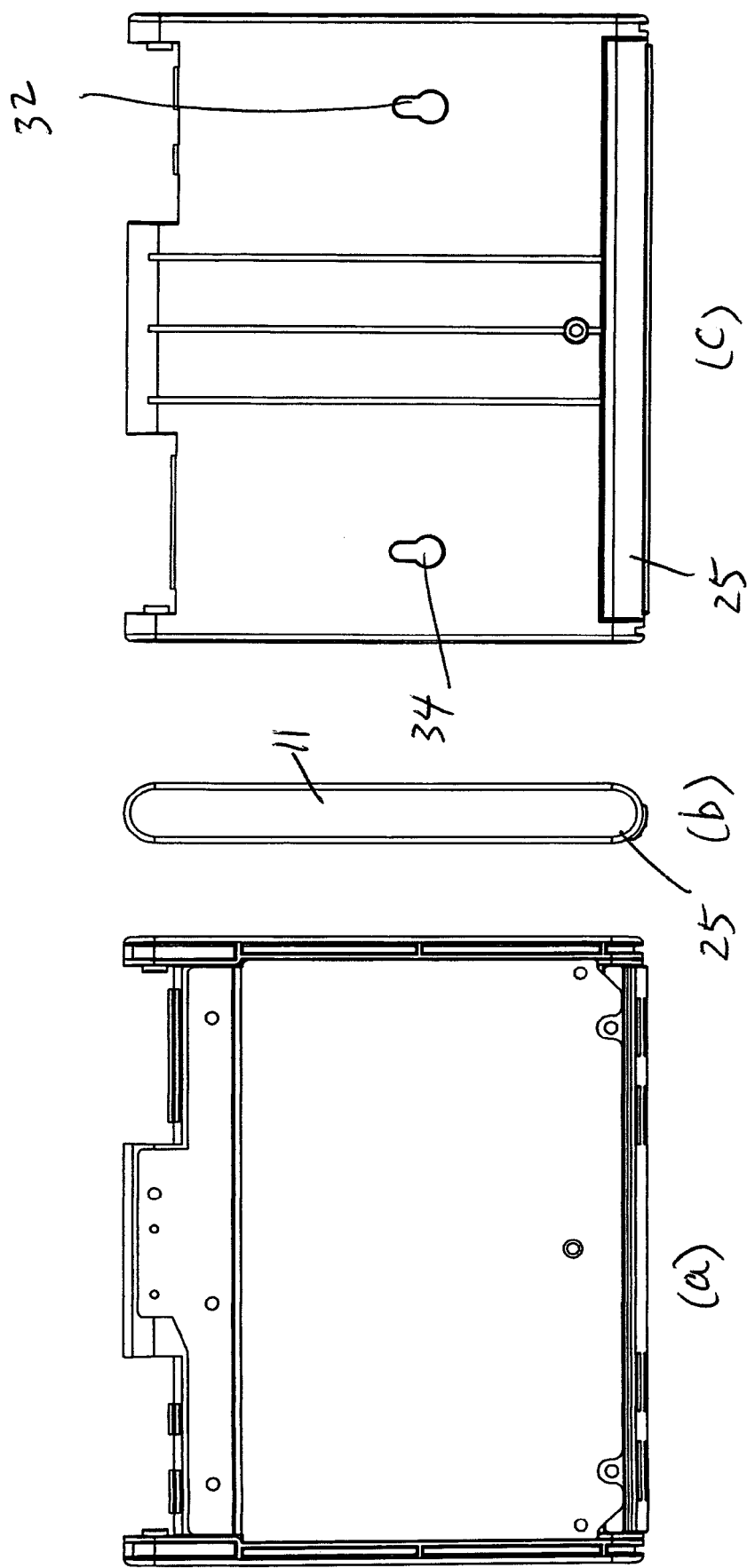
FIGS. 4 (*a*)–(*d*) illustrate the support stand with the extension leg stowed in various views.

Reference is first made to FIGS. 1–2, where an exemplary information kiosk with an adjustable support stand in accordance with the present invention is shown in various views. The information kiosk has a display head 10, upon which a flat liquid crystal display ("LCD") 15 is implemented. The LCD 15, in a preferred embodiment, has a touch sensor to implement a touch screen. Above the top edge of the LCD 15, a built-in barcode scanner 14 is integrated into the body of the display head 10. On the back side of the display head 10, shown in FIGS. 1 (*b*), (*e*) and FIG. 2, an adjustable support stand 11 is connected, by a hinge 16, to present a convenient viewing angle in a "portrait-mode" orientation for the display head 10. The barcode scanner 14 is positioned in such a way that its beam only reaches to a limited area in front of the display head 10, as illustrated in FIGS. 2 (*c*) and (*d*).

To prevent unintentional closing or opening of the support stand 11, the hinge 16 is designed with a certain built-in tension, or friction, so that it can withstand the forces applied to the touch screen LCD 15 without collapsing. At the same time, the built-in tension, or friction, of the hinge 16 should not be so great as to inhibit the desired opening or closing of the support stand 11. Without such tension-based hinge, the display head 10 could be easily toppled by any force applied to the LCD screen 15. Also, when the support stand 11 is retracted, or closed, the tension on the hinge 16 acts to prevent any unintentional outward movement of the support stand 11. Finally, it should be noted that while the hinge 16 is shown having two positions, i.e. open and close, it may be readily designed to allow a variety of angles of deployment by those skilled in the art.

In contrast to the conventional PC-based information kiosks, the information kiosk of the present invention provides different convenient and adjustable viewing angles for the users. Its flat, integrated industrial design requires very little footprint, which is an advantage especially for the often-cluttered countertop space. By using a touch-screen display, the incongruous keyboard is eliminated, since data can now be inputted through the barcode scanner 14, or the touch-screen LCD 15. If supported by the operating system software, a touch screen keyboard panel can be implemented. The integrated barcode scanner 14 allows easy scanning of a barcode on a merchandise, e.g. a prescription dispenser, bar-coded sales receipt, or ID badge, while preventing the users from being exposed to the scanning beam. As illustrated in FIGS. 2 (c) and (d), the bar code scanner 14 projects a scanning beam that is about 24° from the surface of the LCD 15 with a span of about 6.5° from there on.

While the display head 10 shown in FIGS. 1–2 has a portrait orientation, it should be understood by those skilled in the art that a "landscape" orientation may also be readily implemented based on the teaching of the present invention. The portrait orientation is preferably adopted because its overall presentation resembles a letter-size clipboard for easy and natural viewing on the LCD 15.

Referring to FIGS. 1–4, where simplified drawings of the exemplary information kiosk in accordance with the present invention are shown. As shown in FIGS. 2 (a)–(d), the adjustable support stand 11 may be deployed by pivoting it away from the back of the display head 10. Currently, when the support stand 11 is fully deployed, a viewing angle of about 30° from the vertical plane can be achieved. The adjustable support stand 11, which has an internal recess for stowing an extension leg 21 therein, can decrease the viewing angle by pulling out the extension leg 21 from the internal recess, while maintaining the same angle of about 60° between the support stand 11 and the back side of the display head 10. When deployed, the extension leg 21 can be locked to the bottom edge of the support stand 11 by a springy tab 30 integrally formed on the body of the extension leg 21. The bottom edge of the extension leg 21 has an enlarged foot, for the full width of the extension leg 21, with non-skid padding 25 to provide traction, as well as a hand grip when the extension leg 21 is pulled out by the user. When the extension leg 21 is stowed back into the internal recess of the support stand 11, the enlarged foot with the non-skid padding 25 remains on the outside, so as to continue to provide traction for the support stand 11. It should be noted that the extension leg 21 may be implemented to be locked to the support stand 11 at different positions, so that different viewing angles can be achieved, while still maintaining the same angle between the support stand 11 and the back side of the display head 10 at about 60°. As such, the viewing angle can be adjusted by extending and locking the extension leg 21 at different positions, without altering the angle between the support stand 11 and the display head 10. That is, the viewing angles can be adjusted, without compromising the stability of the display head 10. It should be appreciated by those skilled in the art that being able to achieve different viewing angles while maintaining the same support stand angle is advantageous in stabilizing the information kiosk. Of course, the hinge 16 may also be implemented with multiple locking positions, for example by the use of ratchets, to provide additional viewing angles; however, such implementation might impact the kiosk's stability, since the angle between the support stand 11 and the display head 10 would be changed.

As shown in FIGS. 1–4, the support stand 11, when not in use, can be folded into a recess formed on the lower back side of the display head 10, thus making the entire back side generally flat. By this arrangement, the display head 10 can now be wall-mounted by the use of the mounting holes 32, 34, 42, 44 positioned on the outside surface of the support stand 11 and on the upper back side of the display head 10, respectively. The mounting holes 42, 44 are implemented in a pair of protrusions 28, of which their height is generally aligned with the mounting holes 32, 34 on the support stand 11.

The housing structure of the present invention has ventilation openings 50 positioned on the upper back of the display head 10, as illustrated in FIGS. 1 and 2. Since the information kiosk of the present invention seeks to eliminate the noisy fan, the ventilation openings 50 serve to provide circulation and cooling for the overall system.

Figure 5:
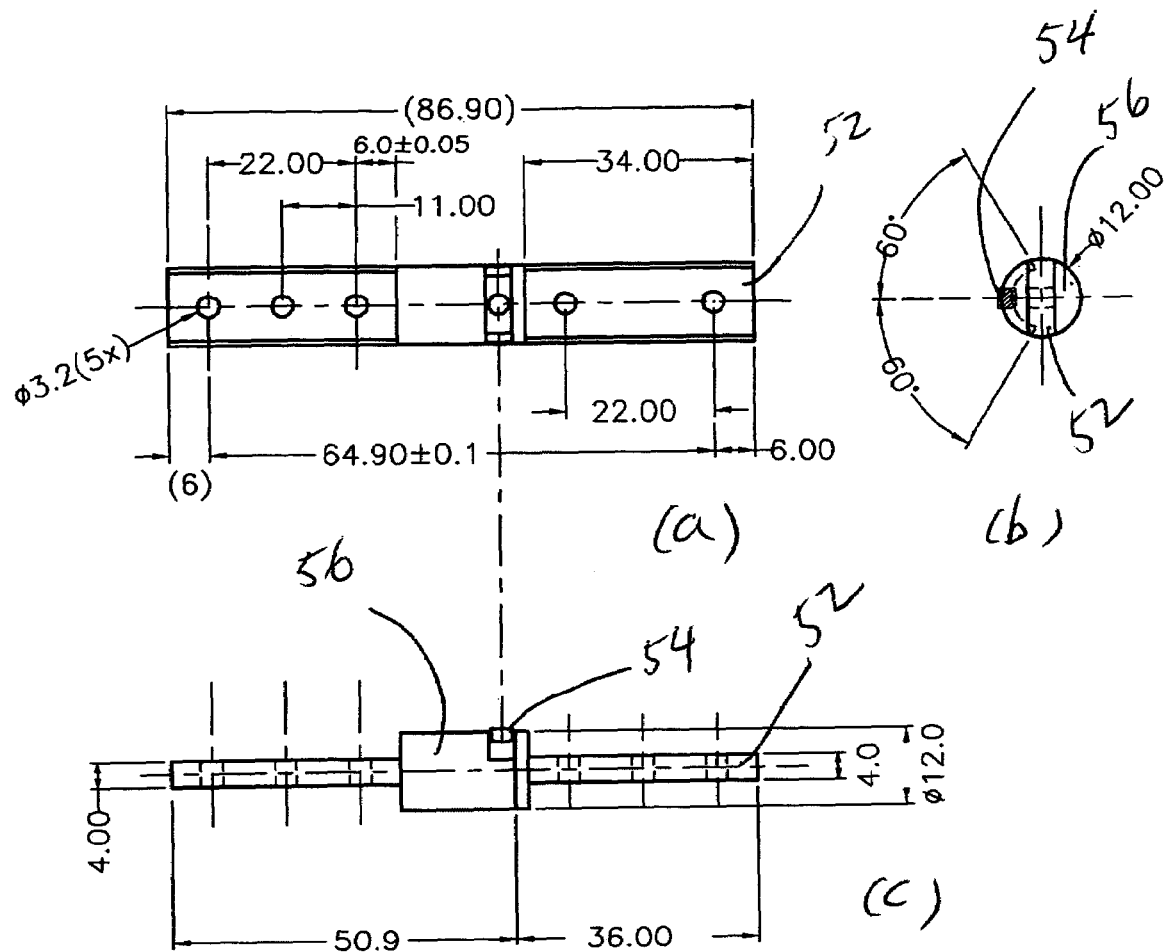
FIGS. 5 (*a*)–(*c*) illustrate the exemplary hinge used in the support stand in various views.

FIG. 5 illustrates the hinge for connecting the support stand and the back side of the display head. It should be appreciated by those skilled in the art that the engineering dimensions are provided herein only for illustration purposes. The exact dimensions will of course be different, depend on the specific design of those skilled in the art. The hinge has a static part 56, which is fixed, and a rotating part 52, which rotates about part 56. Currently, the angle of rotation is 60°, clockwise or counterclockwise, although the support stand only rotates 60° from a closed position to an open position. The rotation stopper 54, which is part of the rotating part 52, is within the opening in the part 56.

Figure 6:
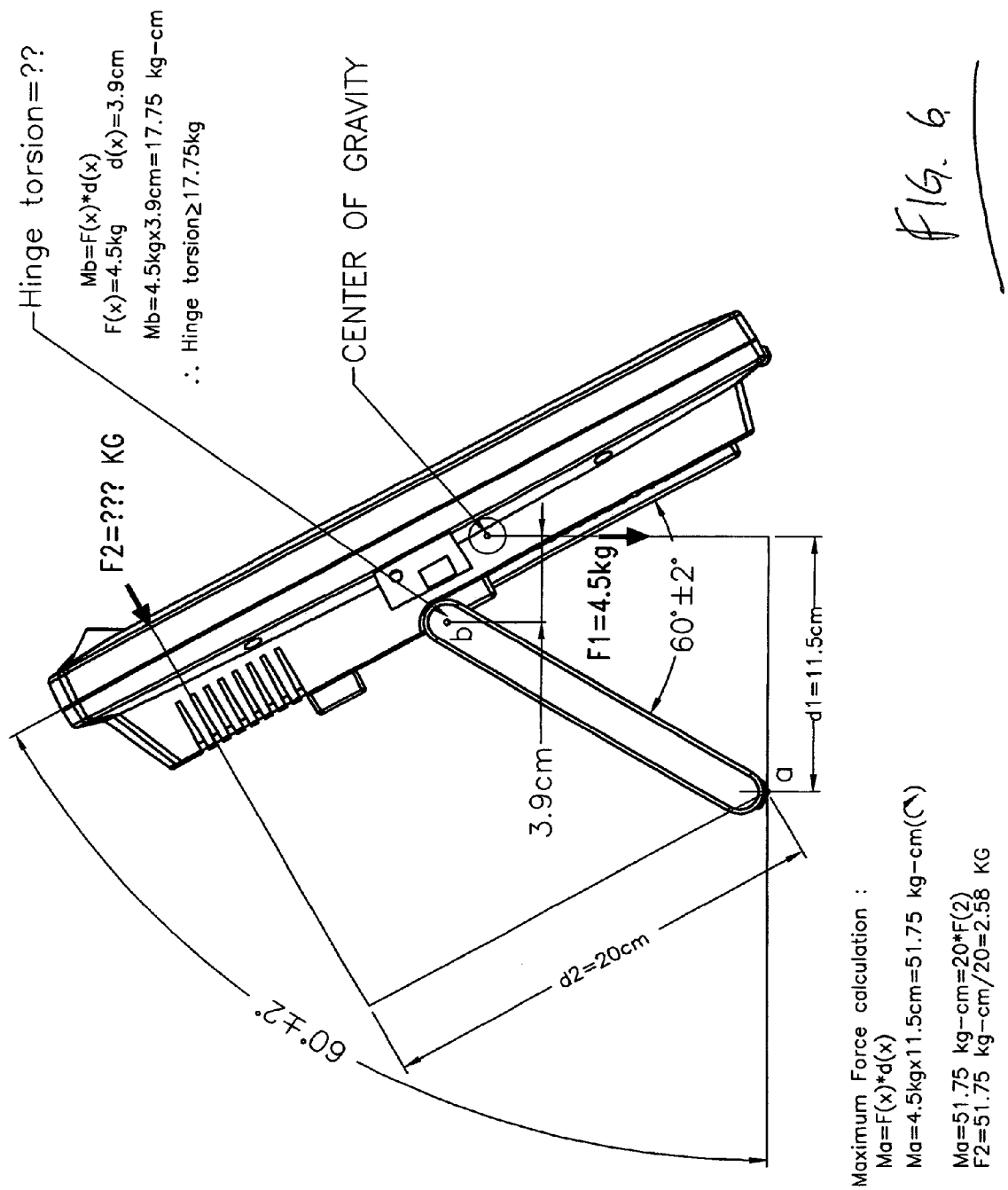
FIG. 6 illustrates the calculation of minimal hinge torsion, where the extension leg is stowed.
Figure 7:
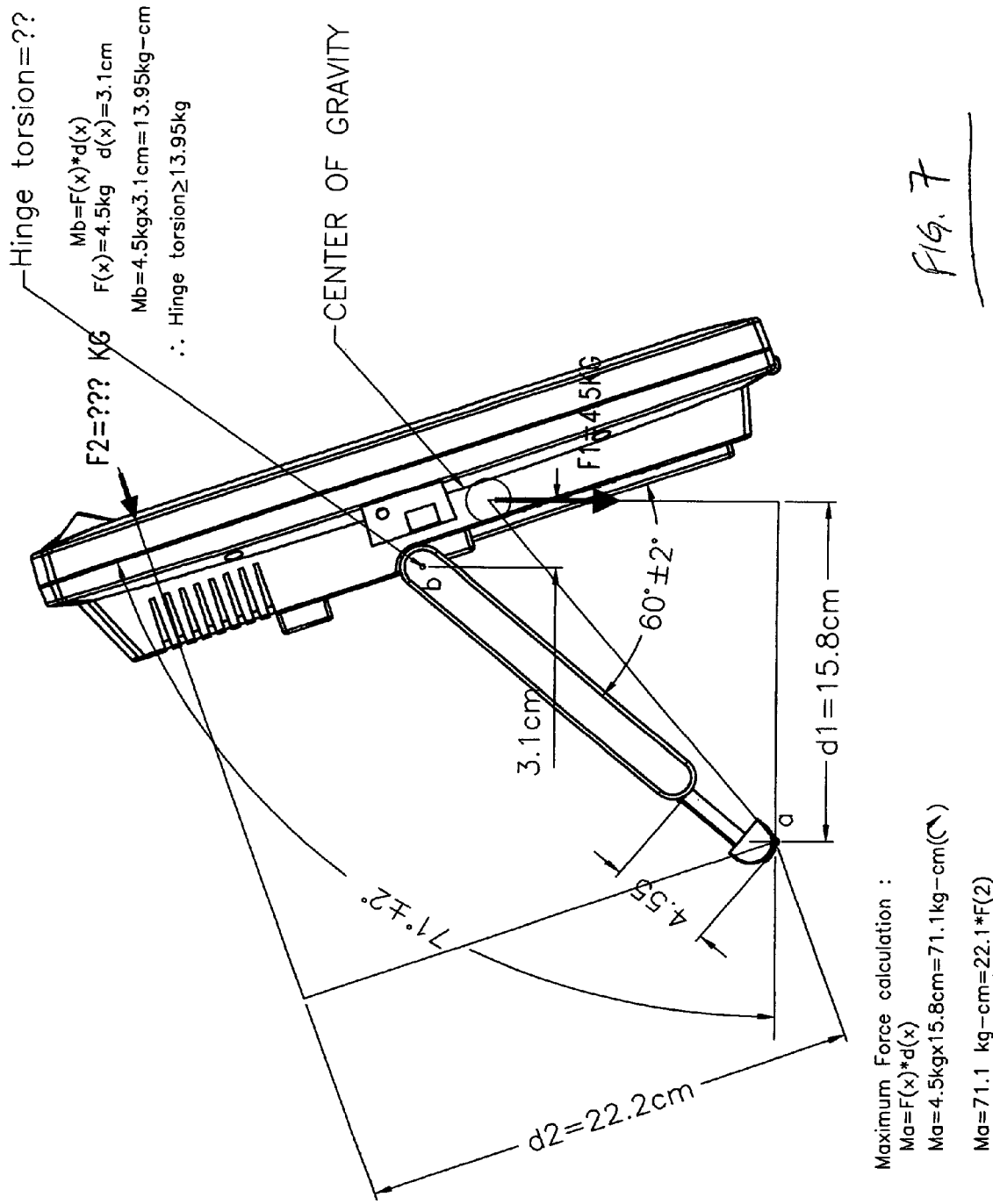
FIG. 7 illustrates the calculation of minimal hinge torsion, where the extension leg is deployed.

As previously described, the hinge 16 preferably has certain minimal hinge torsion, calculated to withstand a maximal force applied to the LCD 15. FIG. 6 illustrates the calculation of minimal hinge torsion when a maximal force F2 of magnitude 2.58 kg is applied to the LCD 15 with the extension leg stowed. As illustrated in the calculation, a minimal torsion of 17.75 kg is preferably needed, for an information kiosk having a weight of 4.5 kg. FIG. 7 illustrates the calculation of minimal hinge torsion when a force F2 of magnitude 3.2 kg is applied but with the extension leg fully extended. As illustrated, minimal hinge torsion of 13.95 kg is preferably needed for the same 4.5 kg of an information kiosk. As can be appreciated by those skilled in the art, a different hinge torsion could be easily calculated based on their own design specifications and the teaching herein.

Although the invention is described herein with reference to the preferred embodiment, one skilled in the art will readily appreciate that other applications may be substituted for those set forth herein without departing from the scope of the present invention. Accordingly, the invention should only be limited by the claims included below.

What is claimed is:

1. An information kiosk, comprising:

a processor, for processing data in said information kiosk;

a memory storage unit, for storing data and software in said information kiosk;

a networking unit, for providing networking access to said information kiosk;

a barcode scanner unit, for scanning a bar code;

a LCD display with touch screen sensors;

a display head having a front face and a back face, said display head being disposed to house said processor, storage unit, memory unit, networking unit and LCD display, said display head having ventilation openings on its upper back face, said display being having a recess on its lower back face, said display head being disposed to house said barcode scanner unit on its upper front face with a predetermined viewing angle;

a support stand hingedly connected to the back face of said display head, disposed to hingedly pivot between said recess on the back face of said display head and a position away from said back face, said support stand having an internal recess;

an extension leg, disposed within said internal recess of said support stand, said extension leg controllably movable from within said internal recess, so as to controllably extend the length of said support stand to alter the viewing angles of the said display head;

at least one locking tab disposed on said extension leg, disposed to releasably engage said extension leg to said support stand.

2. The information kiosk of claim 1, wherein said support stand controllably folds into said recess, forming a flat surface on the back face of said display head, such that said information kiosk can be mounted on the wall.

3. The information kiosk of claim 2, wherein said support stand is engaged to the back face of said display head through a hinge, said hinge having a predetermined tension.

4. The information kiosk of claim 3, wherein said hinge is adapted to provide a plurality of angles of opening.

5. The information kiosk of claim 1, wherein said at least one locking tab is disposed to releasably engage said extension leg to said support stand at different lengths, so as to provide multiple viewing angles of the LCD display, while maintaining the same angle between said support stand and the LCD display.

6. The information kiosk of claim 5, wherein said support stand has multiple engaging positions for said locking tab on said extension leg to releasably engage.

7. An information kiosk, comprising:

a processor, for processing data in said information kiosk;

a memory storage unit, for storing data and software in said information kiosk;

a networking unit, for providing networking access to said information kiosk;

a barcode scanner unit, for scanning a bar code;

a LCD display with touch screen sensors;

a display head having a front face and a back face, said display head being disposed to house said processor, storage unit, memory unit, networking unit and LCD display, said display head having ventilation openings on its upper back face, said display being having a recess on its lower back face, said display head being disposed to house said barcode scanner unit on its upper front face with a predetermined viewing angle;

a support stand, disposed to hingedly pivot between said recess on the back face of said display head and a position away from said back face, said support stand having an internal recess;

an extension leg, disposed within said internal recess of said support stand, said extension leg controllably movable from within said internal recess, so as to controllably extend the length of said support stand to alter the viewing angles of the said display head;

at least one locking tab disposed on said extension leg, disposed to releasably engage said extension leg to said support stand, wherein said support stand controllably folds into said recess, forming a flat surface on the back face of said display head, such that said information kiosk can be mounted on the wall, and wherein said support stand is engaged to the back face of said display head through a hinge, said hinge having a predetermined tension, said information kiosk further comprising:

a pair of protrusions with mounting holes disposed on the upper back face of said display head;

a pair of mounting holes disposed on the support stand, wherein said pair of protrusions and said mounting holes define a generally flat plane.

8. The information kiosk of claim 7, wherein said extension leg has an enlarged foot covered with non-skid padding throughout the width of said extension leg, said enlarged foot remains on the outside after said extension leg is stowed in said internal recess.

9. A flat housing structure for an information kiosk, comprising:

a flat-panel display head, for housing information processing components, said display head having a generally flat front face with a recess on its lower back face;

a barcode scanner, disposed on the top of said front face with a predetermined viewing angle pointing down therefrom;

a plurality of ventilation openings disposed on the upper back face of the display head;

a support stand hingedly connected to the back face of the display head, disposed to hingedly pivot between said recess on the back face of said display head and a position away from said back face, said support stand having an internal recess;

an extension leg, nested within the internal recess of said support stand, said extension leg being disposed to controllably extend from within the internal recess of said support stand, so as to extend the length of said support stand used to alter the viewing angles of the said display head;

at least one locking tab disposed on said extension leg, for releasably engaging said extension leg to said support stand.

10. The housing structure of claim 9, wherein said support stand is disposed to controllably fold into said recess on the back face of said display head, defining a generally flat surface on the back face.

11. The housing structure of claim 10, wherein said support stand is movably engaged to the back face of said display head through a hinge, said hinge having a predetermined tension.

12. The housing structure of claim 11, wherein said hinge is adapted to provide a plurality of angles of opening.

13. The housing structure of claim 9, wherein said at least one locking tab controllably engages said extension leg to said support stand at different lengths, so as to provide multiple viewing angles, while maintaining the same angle between said display head and said support stand.

14. The housing structure of claim 13, wherein said support stand has multiple engaging positions for said locking tab on said extension leg to releasably engage.

15. A flat housing structure for an information kiosk, comprising:
- a flat-panel display head, for housing information processing components, said display head having a generally flat front face with a recess on its lower back face;
- a barcode scanner, disposed on the top of said front face with a predetermined viewing angle pointing down therefrom;
- a plurality of ventilation openings disposed on the upper back face of the display head;
- a support stand, disposed to hingedly pivot between said recess on the back face of said display head and a position away from said back face, said support stand having an internal recess;
- an extension leg, nested within the internal recess of said support stand, said extension leg being disposed to controllably extend from within the internal recess of said support stand, so as to extend the length of said support stand used to alter the viewing angles of the said display head;
- at least one locking tab disposed on said extension leg, for releasably engaging said extension leg to said support stand, wherein said support stand is disposed to controllably fold into said recess on the back face of said display head, defining a generally flat surface on the back face, wherein said support stand is movably engaged to the back face of said display head through a hinge, said hinge having a predetermined tension, said housing structure further comprising:
- a pair of protrusions with mounting holes disposed on the upper back face of said display head;
- a pair of mounting holes disposed on the support stand, wherein said pair of protrusions and said mounting holes define a generally flat plane.

16. The housing structure of claim 15, wherein said extension leg has an enlarged foot covered with non-skid padding throughout the width of said foot, and said enlarged foot remains on the outside after said extension leg is stowed in said internal recess.

* * * * *